United States Patent [19]

Kobayashi et al.

[11] Patent Number: 4,691,591

[45] Date of Patent: Sep. 8, 1987

[54] ROD SEAL DEVICE FOR STIRLING ENGINES

[75] Inventors: Daisaku Kobayashi; Tunesaku Itaba, both of Kashiwazaki; Yutaka Momose, Anjyo, all of Japan

[73] Assignees: Kabushiki Kaisha Riken, Tokyo; Aisin Seiki Kabushiki Kaisha, Aichi, both of Japan

[21] Appl. No.: 828,660

[22] Filed: Feb. 12, 1986

[30] Foreign Application Priority Data

Feb. 20, 1985 [JP] Japan ............................ 60-23260[U]

[51] Int. Cl.[4] ........................ F16H 57/02; F16J 15/00; F16J 3/00

[52] U.S. Cl. ............................ 74/606 A; 277/212 C; 277/212 F; 277/212 R; 55/165

[58] Field of Search .................. 74/606 A; 55/38, 40, 55/43, 46, 70, 165, 166; 60/517; 277/152, 214, 212 C, 212 F, 212 R

[56] References Cited

U.S. PATENT DOCUMENTS

| | | | |
|---|---|---|---|
| 2,350,123 | 5/1944 | Mercier | 277/212 F |
| 2,405,152 | 8/1946 | Kilchenmann | 277/212 |
| 2,515,647 | 7/1950 | Hunt et al. | 55/166 |
| 2,554,622 | 5/1951 | Jones | 277/212 F |
| 2,561,884 | 7/1951 | Perrow | 277/212 C |
| 2,720,280 | 10/1955 | Doyle | 55/46 |
| 2,894,037 | 7/1959 | Kindler | 55/46 |
| 2,906,367 | 9/1959 | Vandenburgh | 55/46 |
| 2,909,241 | 10/1959 | Rummert | 55/46 |
| 3,273,313 | 3/1966 | Livesey et al. | 55/46 |
| 3,367,682 | 2/1968 | Meriano | 277/212 |
| 3,424,371 | 1/1969 | Happe | 55/70 |
| 3,486,297 | 12/1969 | Eisinga et al. | 55/166 |
| 3,495,382 | 2/1970 | Adamik | 55/166 |
| 3,691,730 | 9/1972 | Hickey et al. | 55/166 |
| 3,934,336 | 1/1976 | Stahlecker et al. | 74/606 A |
| 4,055,352 | 10/1977 | Allinquant et al. | 277/212 C |
| 4,089,662 | 5/1978 | Williams | 55/166 |
| 4,149,566 | 4/1979 | Stowe | 277/212 C |
| 4,317,436 | 3/1982 | Barnhart et al. | 277/212 C |
| 4,399,999 | 8/1983 | Wold | 277/212 F |
| 4,601,235 | 7/1986 | Roberts | 277/212 C |

FOREIGN PATENT DOCUMENTS

| | | | |
|---|---|---|---|
| 234499 | 7/1964 | Austria | 55/165 |
| 238521 | 2/1965 | Austria | 277/212 F |
| 1021665 | 12/1957 | Fed. Rep. of Germany | 277/212 |
| 2126610 | 10/1972 | France | 55/165 |
| 0611050 | 5/1978 | U.S.S.R. | 74/606 A |
| 0626289 | 9/1978 | U.S.S.R. | 74/606 A |

*Primary Examiner*—Gary L. Smith
*Assistant Examiner*—Vinh Luong
*Attorney, Agent, or Firm*—Burns, Doane, Swecker & Mathis

[57] ABSTRACT

A rod seal device for a Stirling engine includes a high pressure oil chamber, an oil seal, and a low pressure oil chamber in series disposed between a compression chamber of the engine and a driving unit of power take-off. The oil seal includes an annular slit open to one end of the low pressure oil chamber for scraping oil from low pressure oil chamber to the high pressure oil chamber.

5 Claims, 4 Drawing Figures

ROD SEAL DEVICE FOR STIRLING ENGINES

BACKGROUND OF THE INVENTION

1. Field of the Invention

This invention generally relates to a seal device for the Stirling engine and more particularly to a rod seal device for the piston rod connecting an operating piston of the Stirling engine with a guide piston which serves as a power take-off device such as for example an air conditioner device.

2. Description of the Prior Art

As is seen from the attached FIG. 1, Stirling engine S includes an operating piston 2 in a cylinder to form a compression chamber 3 which is to be connected to an expansion chamber (not shown) through a cooler, a heat exchanger and a heater device (all not shown). As an operating gas, Helium or Hydrogen gas are used to reciprocate piston 1 between the compression chamber and the expansion chamber. Such reciprocating movement of the piston 2 is transmitted to a driving mechanism 12 and is taken out as a mechanical work. Rod 8 connects the piston 2 and the driving mechanism 12 (only a part is shown in the drawing). In order to prevent the leakage of gas from the compression chamber 3 to the driving mechanism, various seal members are provided along the outer peripheral portion of the rod 8. Such seal device includes a scraper seal ring 4, high pressure oil chamber 5, an oil seal ring 6, low pressure oil chamber 7 and another scraper seal ring 4' disposed from top to the bottom as shown in FIG. 1. The two oil chambers 5 and 7 are connected to each other through pump p and check valve for returning the excess oil in the chamber 7 into the chamber 5. In this system, it is necessary to provide an electric circuit to detect the amount of excess oil in the chamber 7 and to actuate the pump correctly.

SUMMARY OF THE INVENTION

It is, therefore, an object of the present invention to provide an improved rod seal device for the Stirling engine which obviates the above conventional drawbacks. It is another object of the present invention to provide an improved rod seal device which facilitates oil scraping from a low pressure oil chamber to high pressure oil chamber. According to the present invention, an oil seal member is provided with a slit means at one end surface facing the low pressure oil chamber. The slit means is open to the surface of the pressure oil chamber and is disposed between the high and low pressure oil chambers to enable the oil scraping from the low pressure oil chamber to the high pressure oil chamber upon the reciprocating movement of the piston rod. Other features and advantages of the present invention will be apparent from the following description taken in conjunction with the accompanying drawings, in which like reference characters designate the same or similar parts throughout the FIGS. thereof.

DESCRIPTION OF THE PREFERRED EMBODIMENT

Figure 1:
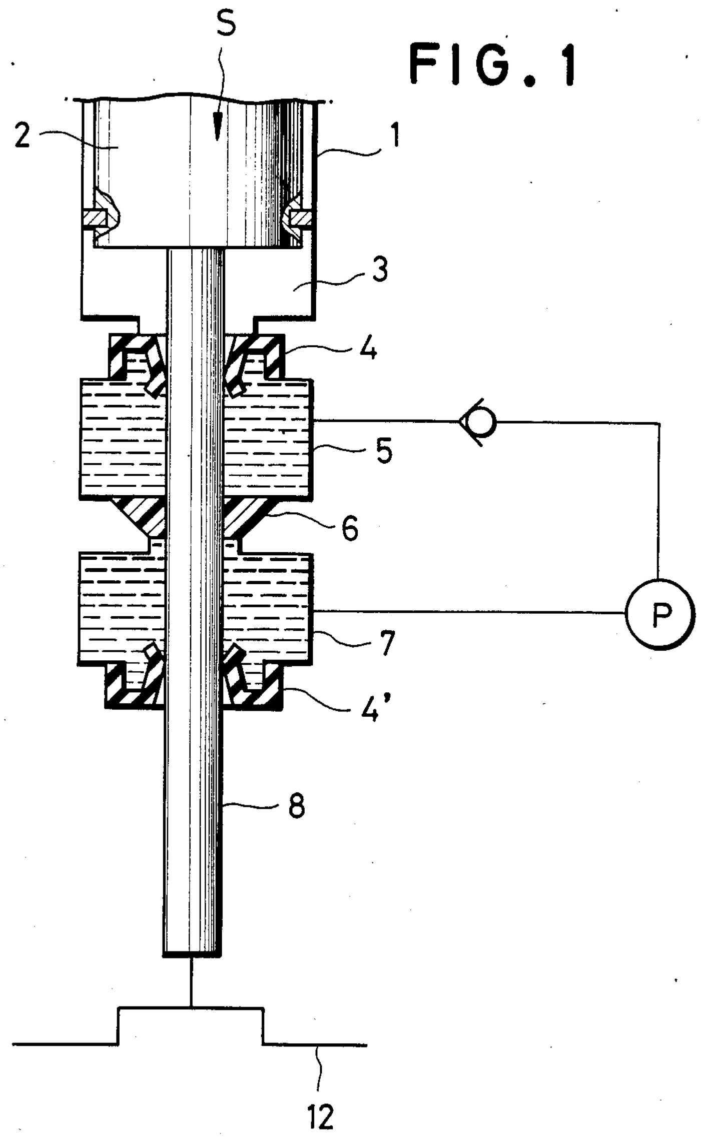
FIG. 1 is a schematic view of a conventional seal device for Stirling engines.
Figure 2:
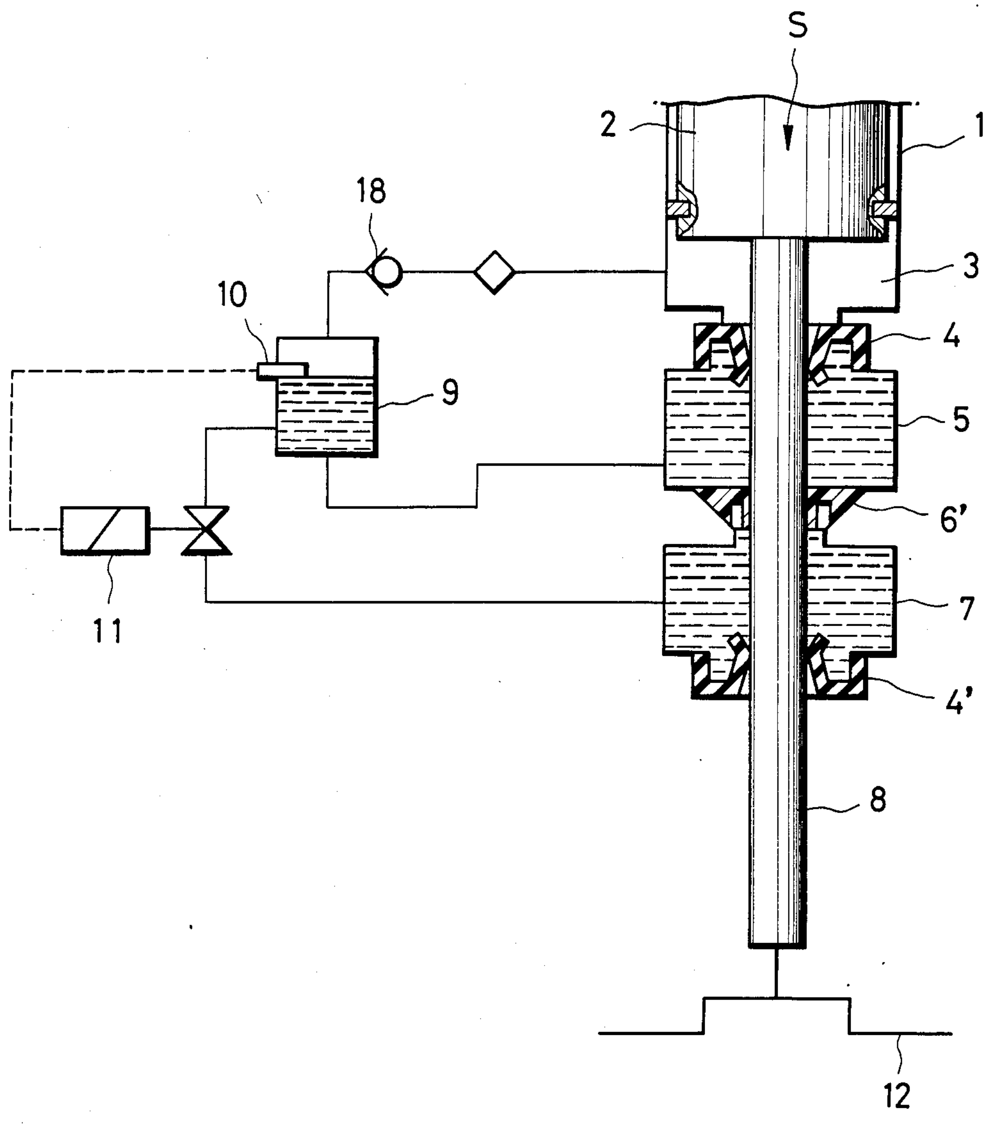
FIG. 2 is similar view to FIG. 1 but showing a preferred embodiment of the present invention.
Figure 3:
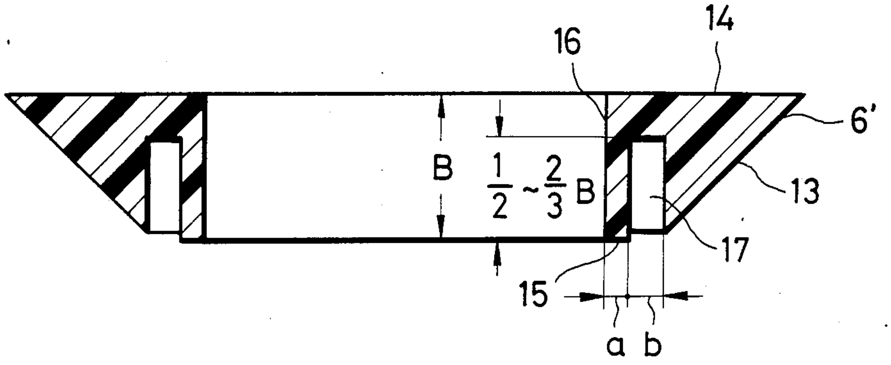
FIG. 3 is a cross sectional view of a seal member of the present invention.
Figure 4:
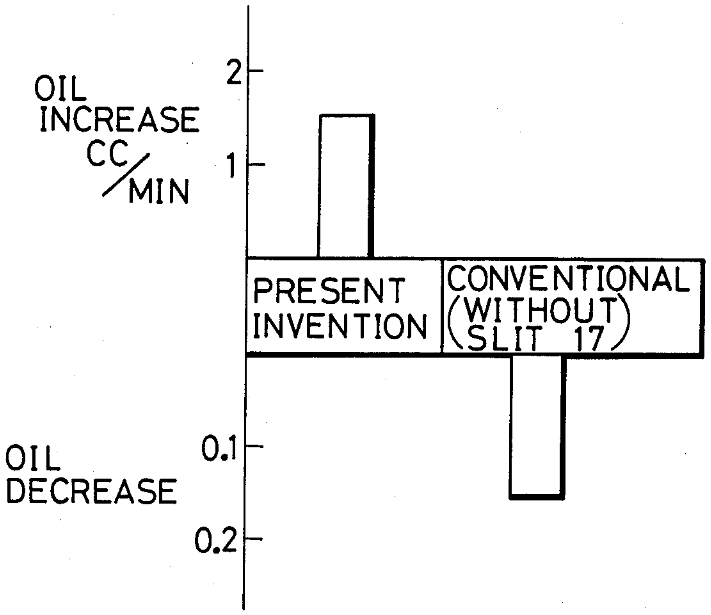
FIG. 4 is a comparative graph showing the results of the present invention comparing with the results of the conventional device.

Referring to FIG. 2 through FIG. 4, reference characters used in FIG. 1 designate same or similar parts in this drawing and therefore, detail explanation thereof will be omitted. The oil seal ring 6' is disposed between the high and low pressure oil chambers 5 and 7 includes a tapered outer peripheral surface 13 which is to be in contact with a holder (not shown), a wider end 14 which receives a high pressure oil from the high pressure oil chamber 5, a smaller end surface 15 which receives a low pressure oil in the low pressure oil chamber 7, an inner peripheral surface 16 in which the piston rod 8 is inserted and a slit 17 which is open to the smaller end surface 15 and is provided axially along the piston rod 8. In FIG. 3, the slit 17 is cut from the smaller end surface 15 to one third or one half of the entire length B of the seal ring 6' and the width b is equal to or twice as long as the length a from the inner peripheral wall to the slit 17. In FIG. 2, the compression chamber 3 is connected to the high pressure oil chamber 5 through oil reservoir 9, check valve 18 and an oil filter. The pressure in the reservoir 9 is maintained to the minimum pressure of the working fluid. A float member 10 is disposed in the reservoir 9 and is electrically connected to a solenoid valve 11 which is disposed in a pressure line connecting the reservoir 9 with the low pressure oil chamber 7. The solenoid valve 11 is actuated to control the fluid communication between the reservoir 9 and the low pressure oil chamber 7 in response to the position of the float member 10 on the oil surface of the reservoir 9. Thus the oil levels of the high and low pressure oil chambers 5 and 7 are always kept to be in predetermined amount.

AN EXAMPLE OF THE EXPERIMENT

The minimum pressure of the working gas was kept to be less than 20 $Kg/cm^2$. The height B of the seal ring 6' was 15 mm and the height of the slit 17 from the surface 15 was 10 mm (two thirds of the entire height B) and the length a from the inner peripheral wall of the ring 6' was 2.5 mm while the width b of the slit 17 was 3 mm. The slit 17 was in annular shape.

Result of the experiment is shown in FIG. 4 wherein, oil scraping amount from the low pressure oil chamber 7 to the high pressure oil chamber 5 was 1.5 cc/min. On the other hand, when another test was done under the same conditions without any slit in the seal ring 6'. Such conventional seal 6 has a tapered inner peripheral surface. The test result shows the leakage of the oil from high pressure oil chamber 5 to the low pressure oil chamber was 0.17 cc/min and there was no oil scraping.

As many various and other embodiment of the present invention can be made without departing from the spirit and the scope of the invention, it is to be understood that the invention is not limited to the specific embodiment illustrated above except as defined in the appended claims.

What is claimed is:

1. A rod seal device for a Stirling engine comprising:

a piston rod connecting an operating piston of the Stirling engine with a driving means serving as a power takeoff;

a first scraper seal ring disposed next to one end of a compression chamber which is defined by one end of said piston and a cylinder of said engine;

a high pressure oil chamber disposed next to said first scraper seal and surrounding said piston rod;

an oil seal disposed next to said high pressure oil chamber and surrounding said piston rod;

a low pressure oil chamber disposed next to said oil seal and surrounding said piston rod;

means for scraping oil from said low pressure oil chamber to said high pressure oil chamber through said oil seal, said urging means including a second scraper seal disposed operatively next to said low pressure oil chamber and surrounding said piston rod, wherein said oil seal includes a tapered outer peripheral surface for contacting a holder, a larger diametrical end surface facing one end of said high pressure oil chamber, a smaller diametrical end surface facing one end of said low pressure oil chamber and an annular slit provided on said smaller diametrical end surface and open thereto; and means for returning oil from said high pressure oil chamber to said low pressure oil chamber, said returning means comprising an oil reservoir, first means for communicating said high pressure oil chamber with said oil reservoir and second means for communicating said oil reservoir with said low pressure oil chamber, whereby oil may flow from said high pressure oil chamber to said low pressure oil chamber through said oil reservoir.

2. The rod seal device according to claim 1, wherein said annular slit of said oil seal is provided axially along the axial line of said piston rod.

3. The rod seal device according to claim 2, further comprising third means for communicating said compression chamber with said reservoir and a check valve at a location along said third communicating means which allows fluid flow only from said reservoir to said compression chamber, and wherein said oil reservoir includes a float member movable in response to the amount of oil in said reservoir.

4. The rod seal device according to claim 3 wherein said second communicating means includes solenoid valve means at a location along a passage connecting said oil reservoir and said low pressure oil chamber for controlling fluid flow between said oil reservoir and said low pressure oil chamber.

5. The rod seal device according to claim 4, wherein said solenoid valve is responsive to movement of said float member in said oil reservoir.

* * * * *